US006764084B1

United States Patent
Nakamura et al.

(10) Patent No.: US 6,764,084 B1
(45) Date of Patent: Jul. 20, 2004

(54) SUSPENSION SYSTEM FOR A STEERABLE WHEEL

(75) Inventors: Atsushi Nakamura, Kanagawa (JP); Hiroyuki Hayashi, Kanagawa (JP); Kazuya Itou, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 417 days.

(21) Appl. No.: 09/706,771

(22) Filed: Nov. 7, 2000

(30) Foreign Application Priority Data

Nov. 8, 1999 (JP) .......................................... 11-317027

(51) Int. Cl.⁷ ................................................ B62D 7/18
(52) U.S. Cl. ........................ 280/93.512; 280/724.134; 280/724.135
(58) Field of Search ....................... 280/86.756, 86.757, 280/93.509, 93.51, 93.511, 93.512, 124.134, 124.135, 124.136

(56) References Cited

U.S. PATENT DOCUMENTS

| | | | | |
|---|---|---|---|---|
| 4,440,420 A | * | 4/1984 | Muller ................. | 280/124.135 |
| 5,009,449 A | * | 4/1991 | Edahiro et al. ........ | 280/124.134 |
| 5,098,116 A | * | 3/1992 | Edahiro et al. ........ | 280/124.135 |
| 5,098,118 A | * | 3/1992 | Hayashi et al. ....... | 280/124.135 |
| 5,348,334 A | * | 9/1994 | Giltinan ............... | 280/124.135 |
| 5,348,337 A | * | 9/1994 | Ando .................... | 280/93.512 |
| 5,374,076 A | * | 12/1994 | Lee ....................... | 280/93.512 |
| 5,507,510 A | * | 4/1996 | Kami et al. ........... | 280/124.135 |
| 5,975,541 A | * | 11/1999 | Harara et al. ......... | 280/124.135 |
| 6,302,420 B1 | * | 10/2001 | Sano .................... | 280/124.135 |
| 6,305,700 B1 | * | 10/2001 | Bruehl ................. | 280/124.134 |

FOREIGN PATENT DOCUMENTS

JP          08-156545          6/1996

* cited by examiner

Primary Examiner—Brian L. Johnson
Assistant Examiner—Christopher Bottorff
(74) Attorney, Agent, or Firm—Foley & Lardner LLP

(57) ABSTRACT

A lower double-joint front suspension system is provided which includes an upper suspension link and a pair of lower suspensions links for supporting a front wheel. The suspension system is adapted to provide a positive scrub radius for a front wheel when the front wheel is steered to serve as an inner wheel during cornering, which positive scrub radius increases with increase of turning of the front wheel away from a neutral position thereof. One of the lower suspension links, which is located in the rear of the other, has a connecting end portion at which it is connected to a vehicle body. The connecting end portion includes a resilient bushing which is less rigid in the width direction than in the longitudinal direction of the vehicle body. By this, when a braking force is applied to the steered inner front wheel during cornering, the resilient bushing is deformed in the width direction and inboard of the vehicle body. Such deformation of the resilient bushing causes rear one of the lower suspension links to turn in the direction to decrease the positive scrub radius, thus making it possible to improve the returnability of a steering wheel.

19 Claims, 4 Drawing Sheets

FRONT OF VEHICLE BODY

LEFT SIDE OF VEHICLE BODY

UPPER SIDE OF VEHICLE BODY

FRONT OF VEHICLE BODY

SUSPENSION SYSTEM FOR A STEERABLE WHEEL

BACKGROUND OF THE INVENTION

The present invention relates in general to a suspension system for a steerable wheel of a vehicle and more particularly to an improvement in a lower double-joint front suspension system for vehicles.

A lower double-joint front suspension system is well known in the art and disclosed in Japanese Patent Provisional Publication No. 8-156545. The lower double-joint front suspension system includes a steering knuckle or wheel carrier rotatably carrying thereon a front wheel, an upper suspension link and a pair of lower suspension links. The upper suspension link is connected to an upper connecting portion of the wheel carrier. The lower suspension links are connected to lower connecting portions of the wheel carrier, which are spaced apart in the longitudinal direction of the vehicle. By the upper and lower suspension links, the wheel carrier is supported in a way as to be steerable or turnable.

SUMMARY OF THE INVENTION

In this kind of suspension system, the front wheel which serves as an inner wheel during cornering encounters the following problem which will be described with reference to FIG. 6.

FIG. 6 is a view for illustrating an operation of a lower double-joint front suspension system for a left front wheel 1 when the left front wheel is steered to the left, i.e., steered so as to move from a neutral position (i.e., position for straight ahead driving) indicated by the solid line to a steered or turned position indicated by a dotted line. By such movement of the left front wheel 1, a transverse link 2, which constitutes front one of the above described lower arms, is caused to pivot about a vehicle body side connecting end portion 2a from a position indicated by a solid line to a position indicated by a dotted line, thus causing a wheel side connecting end portion 2b to move into the position 2b'.

On the other hand, a compression rod 3, which constitutes rear one of the above described lower arms, pivots about a vehicle body side connecting end portion 3a to cause a wheel side connecting end portion 3b to move into the position 3b'.

Accordingly, the center of turning of the left front wheel 1 which serves as an inner wheel at this turning of the vehicle to the left, is moved from the point 4, where a straight line joining the center of the vehicle body side connecting end portion 2a and the center of the wheel side connecting end portion 2b of the transverse link 2 intersects a straight line joining the center of the vehicle body side connecting end portion 3a and the center of the wheel side connecting end portion 3b of the compression rod 3, to the point 5, where a straight line joining the center of the vehicle body side connecting end portion 2a and the center of the wheel side connecting end portion 2b'of the turned transverse link 2 intersect a straight line joining the center of the vehicle body side connecting end portion 3a and the center of the wheel side connecting end portion 3b'of the turned compression rod 3. Thus, the suspension system has a positive scrub radius L1, which is the distance from the turning center 5 to the center of tire contact when observed in a plan.

During such turning or cornering of the vehicle, a braking force FG applied to the center of tire contact is transmitted to the vehicle body side connecting end portion 3a of the compression rod 3 and causes a resilient bushing constituting part of the vehicle body side connecting end portion 3a to deform resiliently and therefore the vehicle body side connecting end portion 3a to move rearward and inboard as indicated by the arrow α due to its resilient deformation characteristics.

Although the resilient deformation of the vehicle body side connecting end portion 3a of the compression rod 3 in the direction indicated by the arrow α does not cause any substantial change of the positive scrub radius L1, the braking force FG tends to cause the steered or turned left front wheel 1 to further turn about the turning center 5 to the left due to the positive scrub radius L1, thus causing a problem of deteriorating the returnability of the steering wheel to its neutral position (i.e., position for straight-ahead driving).

It is accordingly an object of the present invention to provide a suspension system for a steerable wheel which can improve the returnability of a steering wheel to its neutral position.

It is a further object of the present invention to provide a suspension system of the foregoing character which can reduce a positive scrub radius for the steerable wheel when the steering wheel serves as an inner wheel and is subjected to a braking force, whereby to reduce the moment of the force caused by the braking force and tending to turn the inner steerable wheel further in the steered direction.

To accomplish the above objects, the present invention provides a suspension system for a steerable wheel which comprises a wheel carrier rotatably carrying thereon the steerable wheel and having a pair of lower connecting portions spaced apart in the longitudinal direction of a vehicle body, and a pair of lower suspension links pivotally connected to the lower connecting portions of the wheel carrier for supporting the wheel carrier upon the vehicle body in such a manner as to allow the wheel carrier to be steerable. One of the lower suspension links which is disposed in the rear of the other has a connecting end portion at which it is connected to the vehicle body. The connecting end portion of the aforementioned one lower suspension link has a first rigidity to resist change in form in the longitudinal direction of the vehicle body and a second rigidity to resist change in form in the width direction of the vehicle body, the second rigidity being smaller than the first rigidity.

DETAILED DESCRIPTION OF THE PREFERRED EMBODIMENTS

Figure 1:
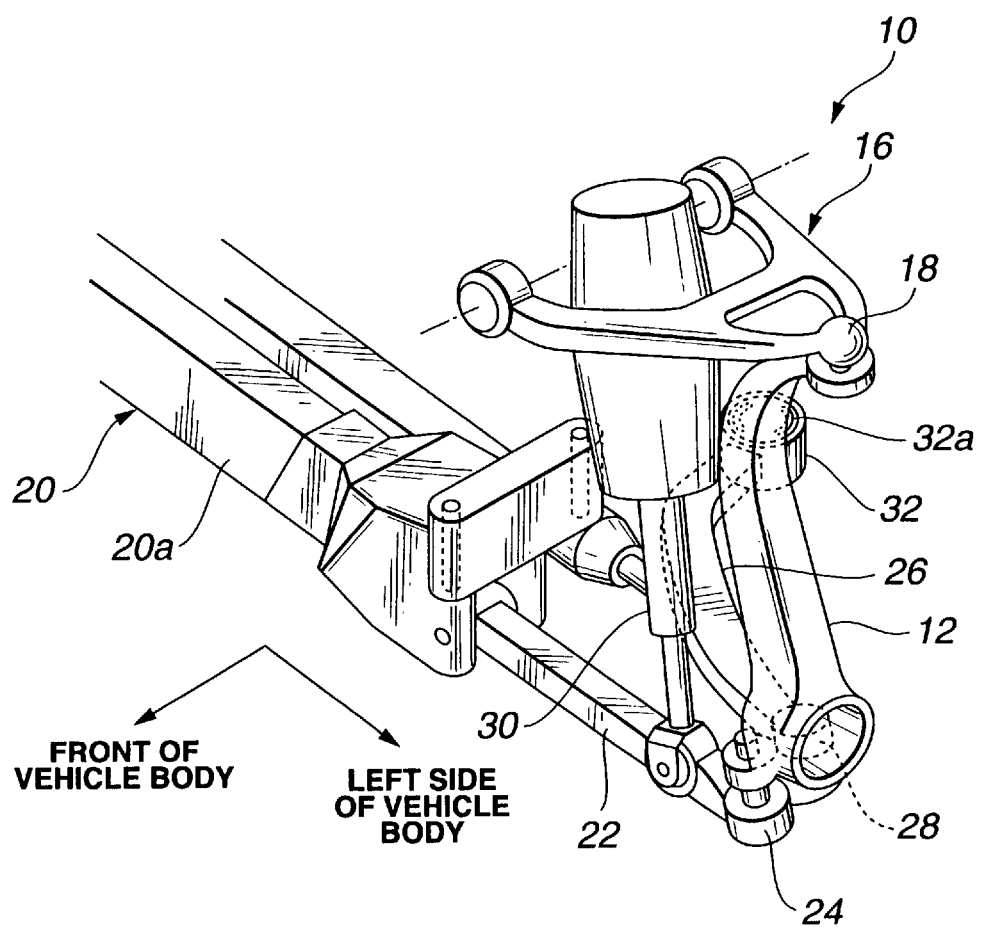
FIG. 1 is a perspective view of a front suspension system according to an embodiment of the present invention.
Figure 2:
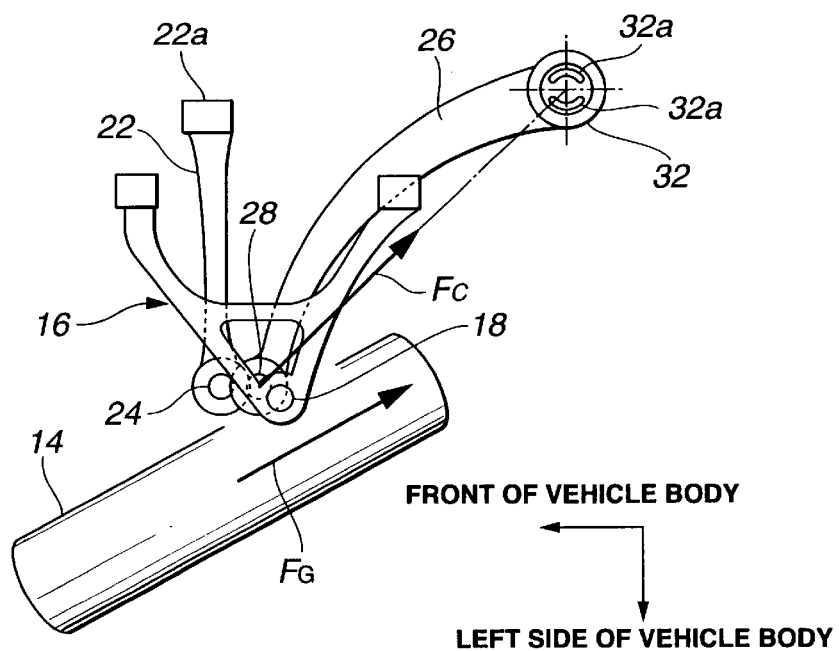
FIG. 2 is a schematic plan view of the front suspension system of FIG. 1.
Figure 3:
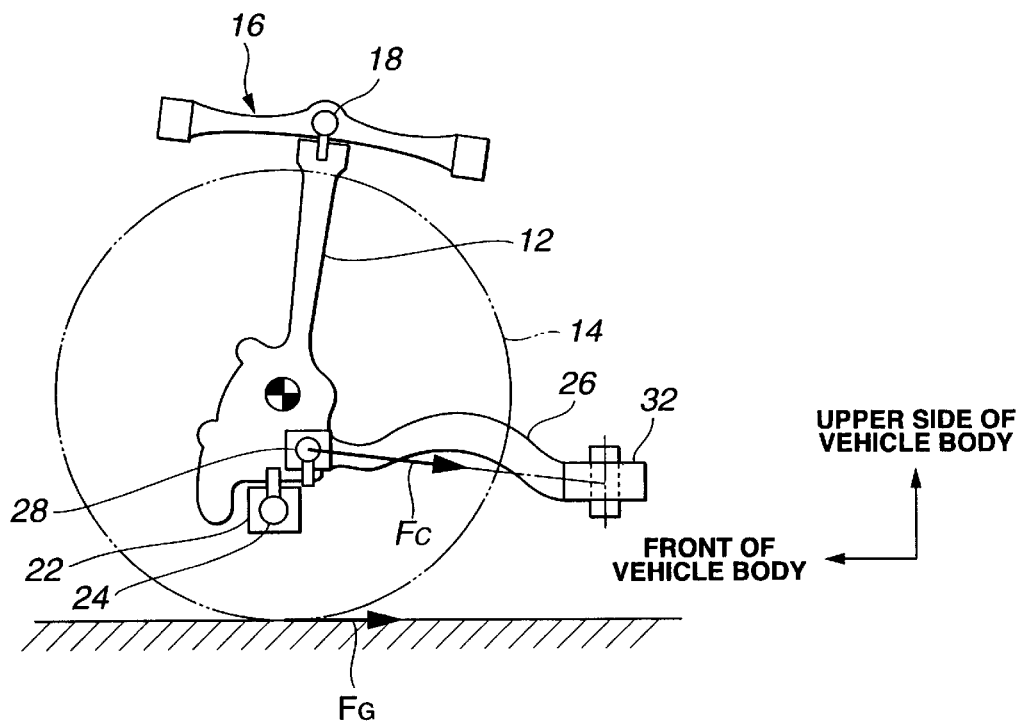
FIG. 3 is a schematic side elevation of the front suspension system of FIG. 1.

Referring to FIGS. 1 to 3, a front suspension system according to an embodiment of the present invention is generally indicated by 10 and includes a steering knuckle 12 which serves as a wheel carrier.

The steering knuckle 12 rotatably carries thereon a left front wheel 14 which is one of a pair of steerable wheels.

The steering knuckle 12 has an upper connecting portion pivotally connected to a connecting end portion of an A-type upper link 16 by means of a ball joint 18. The A-type upper link 16 is connected to a vehicle body 20 having a frame 20a in a way as to be swingable vertically.

The steering knuckle 12 has a lower connecting portion pivotally connected to a connecting end portion of a transverse link 22 by means of a ball joint 24. The transverse link 22 is pivotally connected at the other connecting end portion 22a to the vehicle body frame 20a so as to be swingable vertically. Specifically, the transverse link 22 is so elongated as to extend in the direction transverse to the longitudinal direction of the vehicle body 20. The steering knuckle 12 has another lower connecting portion pivotally connected to a connecting end portion of a compression rod 26 by means of a ball joint 28. The compression rod 26 is supported at the other connecting end portion on the vehicle body 20. Specifically, the compression rod 26 is so elongated and arranged as to extend rearward and inboard from the wheel side connecting end portion where it is connected to the steering knuckle 12 to the vehicle body side connecting end portion where it is connected to the vehicle body 20.

The transverse link 22 and compression rod 26 constitute lower suspension links for supporting the lower portion of the steering knuckle 12 on the vehicle body 20 in such a manner as to allow the steering knuckle 12 to be steerable or turnable. The connecting portions of the steering knuckle 12 for connection to the transverse link 22 and the compression rod 26 are spaced apart in the longitudinal direction of the vehicle body, i.e., the ball joints 24 and 28 are spaced apart in the longitudinal direction of the vehicle body 20.

As shown in FIG. 1, a shock absorber 30 is disposed above the transverse link 22 and has a lower end connected to the transverse link 22 and an upper end connected by way of an insulator (not shown) to the vehicle body 20.

In this embodiment, the compression rod 26 serves as rear one of lower suspension links and has the vehicle body side connecting end portion which is structured as follows for connection to the vehicle body 20.

For joining to the vehicle body 20, the vehicle body side connecting end portion of the compression rod 26 is provided with a cylindrical resilient bushing 32 which is arranged to have an axis extending vertically. The resilient bushing 32 serves as a resilient joint member having a vertical pivot axis and is arranged so that the axis of the resilient bushing 32 coincides with the vertical pivot axis of the joint member. The resilient bushing 32 has a pair of openings 32a which are disposed on the diametrically opposite sides of the axis and in a way as to be opposed in the width direction of the vehicle body 20, i.e., in the direction transverse to the longitudinal direction of the vehicle body 20. By the above openings 32a, the resilient bushing 32 is constructed so as to be less rigid in the width direction than in the longitudinal direction of the vehicle body 20.

The operation of the front suspension system 10 structured as above will be described with reference to FIG. 4.

When the left front wheel 14 is steered to the left so as to serve as an inner wheel during cornering, the transverse link 22 is caused to swing about the vehicle body side connecting end portion 22a and takes the illustrated position. Simultaneously with this, the ball joint 24 disposed at the wheel side connecting end portion of the transverse link 22 is moved to take the illustrated position.

On the other hand, the compression rod 26 is caused to swing about the vehicle body side connecting end portion provided with the resilient bushing 32 and takes the position indicated by the solid line. Simultaneously with this, the ball joint 28 disposed at the wheel side connecting end portion of the compression rod 26 is moved to take the illustrated position.

Figure 6:
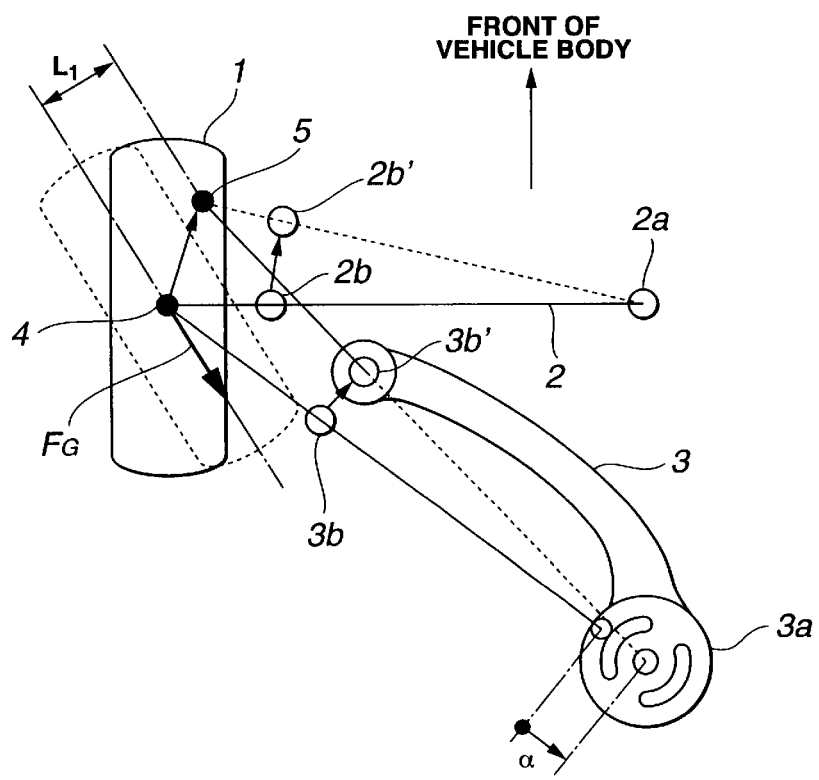
FIG. 6 is a diagrammatic illustration of the operation of a front suspension system which has a problem to be solved by the invention.

Thus, the turning center of the left front wheel 14 is moved into the intersecting point 5 where the straight line joining the center of the vehicle body side connecting end 22a of the transverse link 22 and the center of the ball joint 24 intersects the straight line joining the center of the bushing 32 and the center of the ball joint 28, thus causing the suspension system to have a positive scrub radius L1 similarly to the suspension system shown in FIG. 6. The front suspension system 10 is adapted to have a positive scrub radius L1 when the front wheel 14 is steered to serve as an inner wheel during cornering, which positive scrub radius L1 increases with increase of steering or turning of the front wheel 14 away from the neutral position thereof.

When a braking force FG is applied to the center of tire contact during turning of the vehicle to the left, it is transmitted to the resilient bushing 32 provided to the vehicle body side connecting end portion of the compression rod 26, as indicated by the arrow Fc, whereby the resilient bushing 32 is deformed in the following manner.

Figure 4:
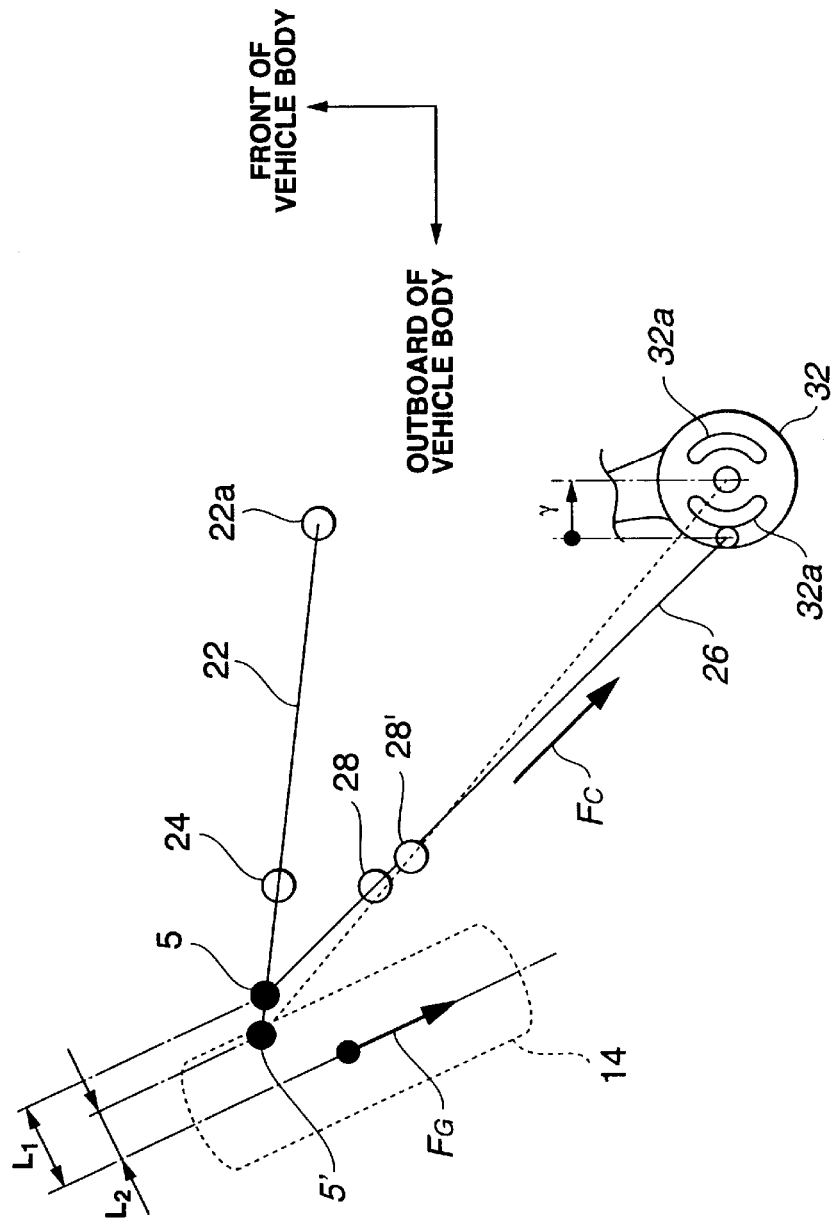
FIG. 4 is a diagrammatic illustration of the operation of the front suspension system of FIG. 1 when a left front wheel in a condition of being steered or turned to the left is braked.

Since the resilient bushing 32 is less rigid in the width direction than in the longitudinal direction of the vehicle body due the openings 32a, it is caused to deform mainly in the width direction and inboard of the vehicle body 20 as indicated by the arrow γ in FIG. 4.

By such deformation of the resilient bushing 32, the compression rod 26 is caused to turn about the ball joint 28 and move from the solid position to the dotted line position in FIG. 4. Simultaneous with this, the ball joint 28 is also moved into the position indicated by 28'. By this, the turning center of the left front wheel 14 is moved in the width direction and outboard of the vehicle body 20, i.e., from the intersecting point 5 into the intersecting point 5'.

The positive scrub radius L2 which is the distance from the center of tire contact to the turning center 5', therefore becomes smaller as compared with the positive scrub radius L1, thus making it possible to decrease the moment of the force tending to turn the front wheel 14 further to the left and thereby improve the aforementioned returnability.

In the meantime, in this embodiment, in order that the vehicle body side connecting end portion of the compression rod 26 which is rear one of the lower suspension links, can be less rigid in the width direction than in the longitudinal direction of the vehicle body 20, the resilient bushing 32 which constitutes the vehicle body side connecting end portion is arranged so as to have an axis extending vertically and formed with the openings 32a for making the resilient bushing 32 retain a less rigidity of restricting change in form in the width direction of the vehicle body 20 than the rigidity of restricting change in form in the longitudinal direction of the vehicle. Accordingly, the present invention can be attained by the use of the resilient bushing 32 which is not special but of a generally used type and without the necessity of a special attaching structure, i.e., the above described effect of the present invention can be obtained with a simple structure and therefore at low cost.

Figure 5:
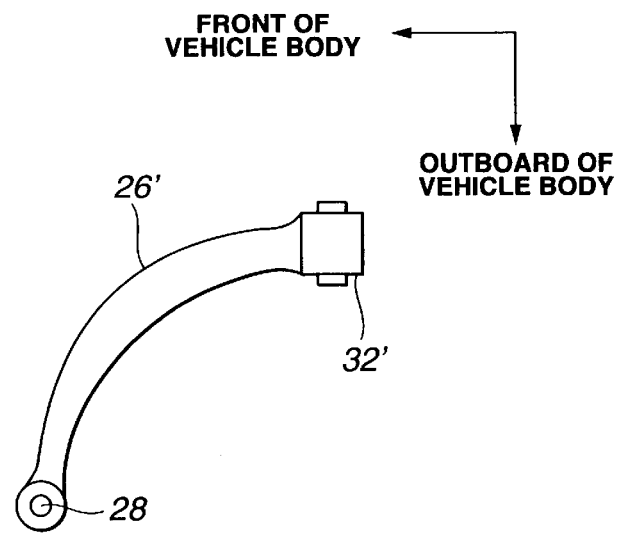
FIG. 5 is a plan view of a variant of the compression rod of the front suspension system of FIG. 1.

FIG. 5 shows a variant of the compression rod 26. In this variant, the vehicle body side connecting end portion of the compression rod 26' has a horizontal pivot axis extending in the width direction of the vehicle body 20 and is provided with a cylindrical resilient bushing 32' which is arranged so as to have an axis coinciding with the pivot axis. The resilient bushing 32' is less rigid in the width direction than in the longitudinal direction of the vehicle body 20. The resilient bushing 32' does not require such openings 32a as in the bushing 32 and therefore can be manufactured with ease, thus making it possible to attain the effect of the present invention with a simple structure and therefore at low cost.

The entire contents of Japanese Patent Application P11-317027 (filed Nov. 8, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, the openings 32a of the resilient bushing 32 can be replaced by other hollow portions or portions having a less rigidity. Further, the present invention can be applied to a suspension system for a steerable wheel other than a front suspension system. The scope of the invention is defined with reference to the following claims.

What is claimed is:

1. A suspension system for a steerable wheel comprising:
   a wheel carrier rotatably carrying thereon the steerable wheel and having a pair of lower connecting portions spaced apart in the longitudinal direction of a vehicle body; and
   a pair of lower suspension links pivotally connected to said lower connecting portions of said wheel carrier for pivotally supporting said wheel carrier upon the vehicle body;
   one of said lower suspension links which is disposed in the rear of the other, having a connecting end portion at which it is connected to the vehicle body;
   said connecting end portion of said one lower suspension link having a first rigidity to resist change in form in the longitudinal direction of the vehicle body and a second rigidity to resist change in form in the width direction of the vehicle body, said second rigidity being smaller than said first rigidity.

2. The suspension system according to claim 1, wherein said connecting end portion of said one lower suspension link comprises a cylindrical resilient bushing arranged so as to have an axis extending vertically, said resilient bushing having a pair of hollow portions which are disposed on the diametrically opposite sides of said axis and in a way as to be opposed in the width direction of the vehicle body.

3. The suspension system according to claim 2, wherein said hollow portions comprise axial openings.

4. The suspension system according to claim 1, wherein said connecting end portion of said one lower suspension link comprises a resilient, cylindrical bushing having an axis extending in the longitudinal direction of the vehicle body.

5. A suspension system according to claim 1, wherein said one lower suspension link has a second connecting end portion connected to one of said lower connecting portions of said wheel carrier, said one lower suspension link being so elongated as to extend rearward and inboard from said connecting end portion toward said first-mentioned connecting end portion.

6. A suspension system according to claim 1, wherein the other of said lower suspension links is so elongated as to extend in the direction transverse to the longitudinal direction of the vehicle body.

7. A suspension system according to claim 1, further comprising an upper suspension link pivotally connected to an upper connecting portion of said wheel carrier to support said wheel carrier upon the vehicle body.

8. A suspension system according to claim 7, wherein said upper suspension link is of the A-type.

9. The suspension system according to claim 1, wherein when said steerable wheel is turned away from a neutral position during braking said one of said lower suspension links increases a positive scrub radius for said steerable wheel.

10. The suspension system according to claim 9, wherein when said steerable wheel is turned towards a neutral position during braking said one of said lower suspension links reduces a positive scrub radius for said steerable wheel.

11. The suspension system according to claim 10, wherein said positive scrub radius is the distance from a turning center to a center of tire contact of said steerable wheel.

12. A front suspension system comprising:
    an upper suspension link and a pair of lower suspension links for supporting a front wheel and adapted to have a positive scrub radius for the front wheel when the front wheel is steered to serve as an inner wheel during cornering,
    wherein said positive scrub radius increases with increase of turning of the front wheel away from a neutral position thereof, and
    wherein one of the lower suspension links includes a connecting end portion at which it is connected to a vehicle body by a resilient joint member which is less rigid in the width direction than in the longitudinal direction of the vehicle body.

13. A front suspension system according to claim 12, wherein said joint member comprises a cylindrical resilient bushing which is arranged so as to have an axis extending vertically, said resilient bushing having a pair of hollow portions which are disposed on the diametrically opposite sides of said axis and in a way as to be opposed in the width direction of the vehicle body.

14. A front suspension system according to claim 13, wherein said hollow portions comprise axial openings.

15. A front suspension system according to claim, wherein said joint member comprises a cylindrical resilient bushing which is arranged so as to have an axis extending in the width direction of the vehicle body.

16. A method of adjusting a positive scrub radius of a steerable wheel, comprising the steps of:
    providing a vehicle suspension system including:
      a wheel carrier rotatably carrying said steerable wheel, said wheel carrier having a pair of lower connecting portions; and
      a compression member with a first end connected to one of said lower connecting portions and a second end connected to a vehicle body by a resilient bushing,
      wherein said resilient bushing is less rigid in a width direction than in a longitudinal direction of said vehicle body;
    turning said steerable wheel;
    applying a braking force to said turned steerable wheel, said applied braking force being transferred along said compression member to said resilient bushing;
    deforming said resilient member bushing with said transferred braking force, said deformation simultaneously moving said one of said lower connecting portions and swinging said compression member about said one of said lower connecting portions such that the positive scrub radius of said steerable wheel is changed.

17. The method according to claim 16, wherein when said steerable wheel is turned away from a neutral position during braking the positive scrub radius for said steerable wheel increases.

18. The method according to claim 17, wherein when said steerable wheel is turned towards a neutral position during braking the positive scrub radius for said steerable wheel decreases.

19. The method according to claim 18, wherein said positive scrub radius is the distance from a turning center to a center of tire contact of said steerable wheel.

* * * * *